E. J. BESEMAN & F. NICHOLS.
WIND SHIELD.
APPLICATION FILED JUNE 19, 1911.
1,034,679.
Patented Aug. 6, 1912.
2 SHEETS—SHEET 2.
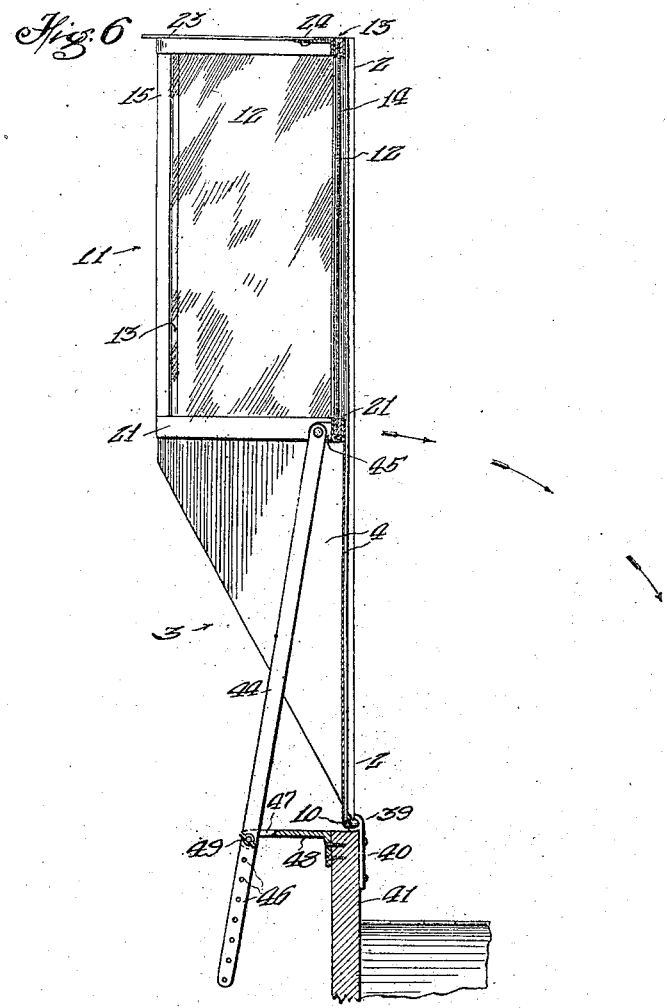
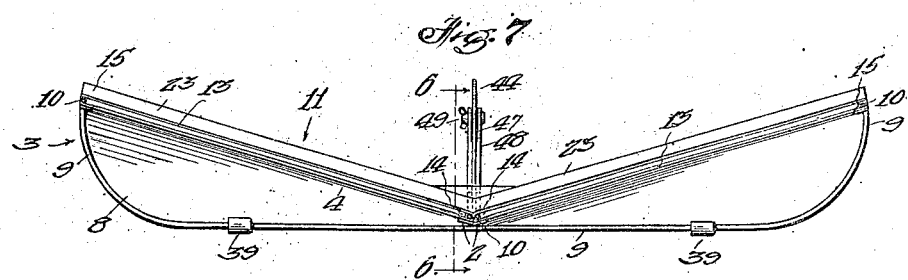
Witnesses:
Inventors,
Edward J. Beseman,
and Frederick Nichols;
by
their atty.

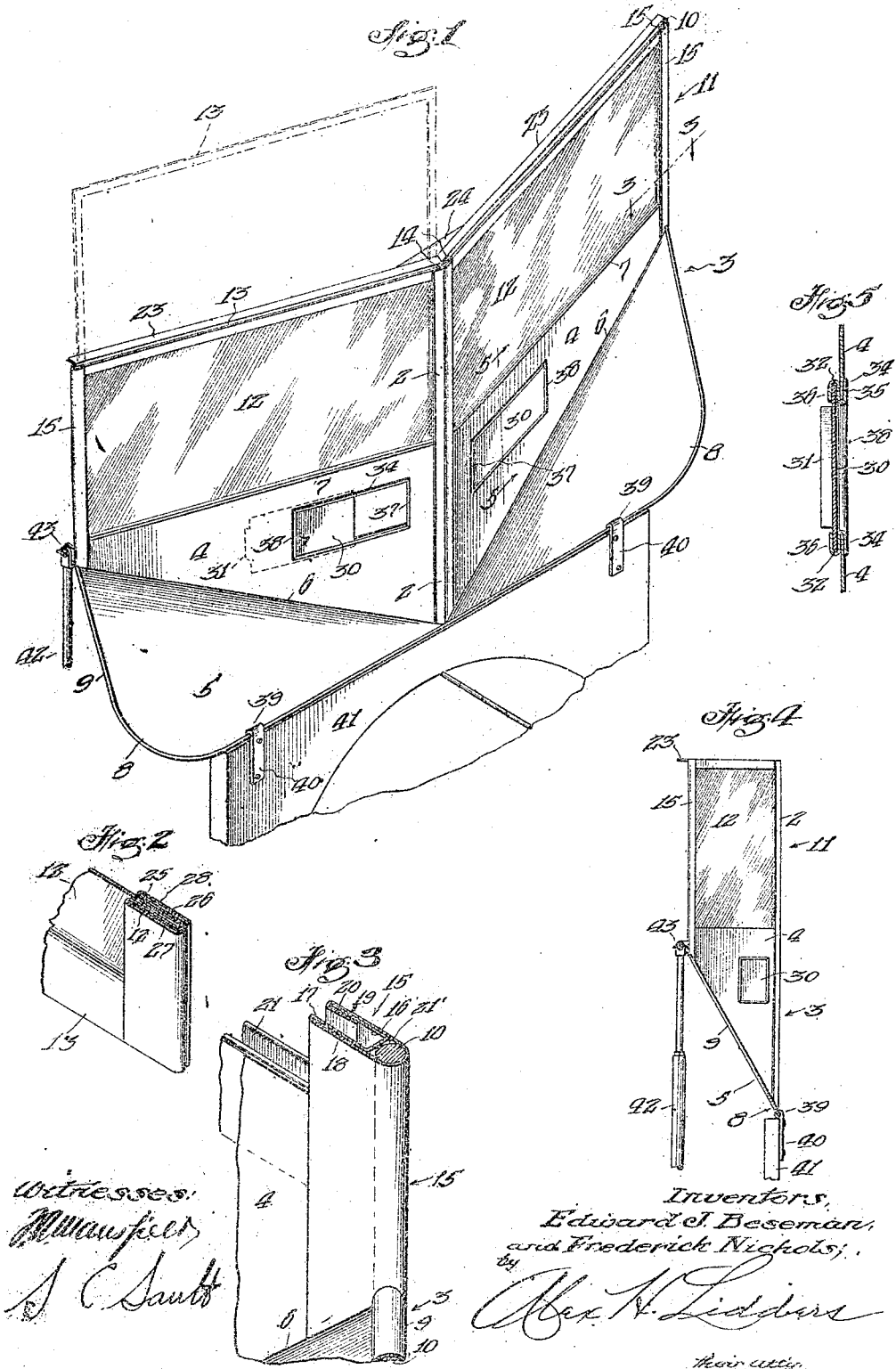

UNITED STATES PATENT OFFICE.

EDWARD J. BESEMAN AND FREDERICK NICHOLS, OF LOS ANGELES, CALIFORNIA; SAID NICHOLS ASSIGNOR TO SAID BESEMAN.

WIND-SHIELD.

1,034,679.  Specification of Letters Patent.  Patented Aug. 6, 1912.

Application filed June 19, 1911. Serial No. 634,134.

*To all whom it may concern:*

Be it known that we, EDWARD J. BESEMAN and FREDERICK NICHOLS, both citizens of the United States of America, both residing at Los Angeles, in the county of Los Angeles, State of California, have invented a certain new and useful Wind-Shield; and we do hereby declare the following to be a full, clear, and exact description of the invention, such as will enable others skilled in the art to which it appertains to make and use the same.

This invention relates to wind shields, more particularly to improvements in a wind shield for use on automobiles; and it may be said to consist in the provision of the novel features in the wind shield, and in the novel and improved construction, arrangement and combination of the parts thereof, as will be apparent from the description and claims hereinafter.

One object of the invention is to provide a wind shield of a novel and improved form, which, when applied to an automobile, is adapted to act effectively to accomplish its purpose.

Other objects of the invention are to provide a wind shield which is light in weight, strong and durable in use, decidedly economical in the cost of material and of manufacture, and attractive in appearance.

Other objects and the advantages of the invention will be apparent to those skilled in the art from a consideration of the following description of the preferred form of construction in which the invention may be embodied, taken in connection with the accompanying drawings, in which—

Figure 1 is a perspective view of a wind shield having the invention embodied therein; Fig. 2 is a fragmentary view of the construction of one of the transparent panels; Fig. 3 is a view taken on the line 3—3 of Fig. 1; Fig. 4 is an end elevation of the wind shield; Fig. 5 is a view taken on the line 5—5 of Fig. 1; Fig. 6 is a view taken on the line 6—6 of Fig. 7, and Fig. 7 is a plan view of a modified form of construction for the wind shield.

Referring now to the drawings, the central angular upright strip 2, preferably of sheet metal, may have suitably secured thereto to the lower portion thereof the lower portion 3 of the wind shield. The lower portion 3 of the wind shield is preferably made of sheet metal formed, as shown, to provide substantially plane vertical portions 4 which extend rearwardly and outwardly from the strip 2, and also the substantially plane portions 5 which extend forwardly and downwardly from the portions 4 and preferably join the portions 4 in a straight line 6 which extends from the lower end of strip 2 and approaches the upper edge 7 of the portions 4 toward the outer ends of the portions 4. The portions 5 are preferably rounded at the corners 8 and may have the edge portion 9 thereof turned over to be secured to a stiffening rod 10.

The upper portion 11 of the wind shield may consist of the transparent panels 12 each secured in a frame 13 and mounted in the slightly yielding slideways 14 and 15 which are respectively secured to the strip 2 and the outer end portion of the portion 4 of the wind shield and are arranged in substantially the same plane as the portions 4.

As shown more clearly in Fig. 3, the slideways 15 are each preferably made up of a single strip of sheet metal formed to provide the spaced side portions 16 and 17, the portion 18 which overlaps and is pressed against the side portion 17, the socket 21′ through which the rod 10 extends, and the portions 19 and 20 which overlap and are pressed against the side portion 16. A channel 21 may be suitably secured to the upper end portion of the portions 4 of the wind shield and said channel may extend between the slideways 14 and 15 and be adapted to receive the lower end portion of frame 13. The channels 21 and slideways 14 may be formed similar to the slideways 15. Sheet metal brace strips 23 may be suitably secured to and connected between the upper end portions of the slideways 14 and 15 and a sheet metal brace plate 24 may be secured to the strips 23.

The panels 12 preferably consist of sheets of celluloid secured to the frame 13, which latter, as shown more clearly in Fig. 2, may have each of its sides made up of a single strip of sheet metal and formed with the end portions 25 and 26 doubled on itself and with the portions 27 and 28 overlapping the portions 25 and 26, whereby, when the edge portion of the sheet of celluloid has been looped over the portion 25, the portions 5, 26, 27 and 28 may be pressed together and the edge portion of the sheet of celluloid clamped between the portions 25, 27 and 28.

One or more ventilators 29 may be provided in the wind shield and each ventilator may consist of a door 30 which, by means of a side piece 31 thereon, is adapted to be moved to slide in guideways 32 arranged above and below an opening preferably made in the portion 4 of the wind shield.

As shown more clearly in Fig. 5, the guideways 32 may be made of a single strip of sheet metal formed with overlapping portions 34 and 35 adapted to be pressed against and secured to the portion 4 of the wind shield, and with a portion 36 spaced from the portion 35 to provide the guideway 32 on the rear of the portion 4 of the wind shield. If desired, the end 37 of the ventilator may have thereon a strip formed similarly to the strip 33 and the end 38 of the ventilator may consist of a strip formed with merely the overlapping portions 34 and 35 adapted to be pressed against and secured to the portion 4 of the wind shield. The strips surrounding the opening in the ventilator are preferably mitered to effect a neat appearance.

In applying the wind shield to an automobile, the rod 10 may pass loosely through loops 39, Fig. 1, of hinge members 40 affixed to a suitable stationary part 41 of the automobile, and extensible rods 42 may have one end thereof hingedly connected to a suitable lug 43 on the wind shield and have the other end thereof suitably connected with a stationary part, not shown, on the automobile.

To adjust the wind shield in tilted position any suitable mechanism may be employed; that shown consisting of a link 44 which has the upper end thereof pivotally connected with an ear 45 disposed substantially centrally on the rear of the wind shield and which has the lower end portion thereof provided with a plurality of spaced openings 46 and passing between bifurcations 47 on a bracket 48 suitably secured to the stationary part 41; a pin 49 being adapted to pass through openings in the bifurcations 47 and in one of the openings 46 to hold the wind shield in adjusted position.

From the foregoing, it will be apparent that the construction is well designed to carry out the objects of the invention. It has been found by experiment that the wind shield acts to cut air and the portion of the air which strikes the panels 12 as well as the portion which strikes the portion 5 of the wind shield are both deflected toward each other and outwardly past the outer ends of the wind shield, whereby occupants of the automobile escape the usual down draft of air accompanying the use of the ordinary wind shield. The action of the wind shield to deflect the air sidewise past the outer ends of the wind shield, as just explained, is especially marked when the wind shield is tilted slightly forwardly and downwardly.

While one form of construction in which the invention may be embodied has been illustrated and particularly described, many changes and modifications thereof will readily occur to those skilled in the art; wherefore the right is reserved to all such changes and modifications as do not depart from the spirit and scope of the invention as defined in the appended claims.

We claim:

1. A wind shield comprising an upright central strip, a lower sheet metal portion affixed to said strip and consisting of substantially plane vertical portions extending outwardly and rearwardly from said central strip and substantially plane portions extending forwardly and downwardly from the vertical portions and joining said vertical portions in a substantially straight line which approaches the upper edge of the vertical portions toward the outer end thereof, and an upper portion consisting of slideways affixed to said strip and to said lower sheet metal portion, and transparent panels arranged in said slideways in substantially the same plane as said vertical portions, substantially as described.

2. A wind shield comprising an upright central strip, a lower sheet metal portion affixed to said strip and consisting of substantially plane vertical portions extending outwardly and rearwardly from said central strip and substantially plane portions extending forwardly and downwardly from the vertical portions and joining said vertical portions in a substantially straight line which approaches the upper edge of the vertical portions toward the outer ends thereof, and an upper portion consisting of transparent panels arranged in substantially the same plane as said vertical portions, substantially as described.

3. A wind shield comprising an upright central strip, a stiffening rod, a lower sheet metal portion having the edge portion thereof secured to said stiffening rod and consisting of substantially plane vertical portions extending outwardly and rearwardly from said central strip and also substantially plane portions extending forwardly and downwardly from the vertical portions and joining said vertical portions in a substantially straight line which approaches the upper edge of the vertical portions toward the outer ends thereof, and an upper portion consisting of slightly yielding slideways and transparent panels slidably arranged in said slideways in substantially the same plane as said vertical portions, substantially as described.

4. A wind shield comprising an upright central strip, a stiffening rod, a lower sheet metal portion affixed to said strip and having the edge portion thereof secured to said stiffening rod and consisting of substantially plane vertical portions extending outwardly and rearwardly from said central strip and also substantially plane portions extending forwardly and downwardly from the vertical portions and joining said vertical portions in a substantially straight line which approaches the upper edge of the vertical portions toward the outer ends thereof, an upper portion consisting of slightly yielding slideways affixed to said strip and to said lower sheet metal portion, and framed transparent panels arranged in said slideways in substantially the same plane as said vertical portions, substantially as described.

5. A wind shield comprising an upright central strip, a lower sheet metal portion affixed to said strip and consisting of substantially plane vertical portions extending outwardly and rearwardly from said central strip and substantially plane portions extending forwardly and downwardly from the vertical portions and joining said vertical portions in a substantially straight line which approaches the upper edge of the vertical portions toward the outer ends thereof, and an upper portion consisting of slightly yielding slideways and transparent panels of celluloid provided with frames and movably arranged in said slideways in substantially the same plane as said vertical portions.

6. A wind shield comprising an upright central strip, a stiffening rod, a lower sheet metal portion consisting of substantially plane vertical portions extending outwardly and rearwardly from said central strip and substantially plane portions having the edge portion thereof secured to the stiffening rod and extending forwardly and downwardly from the vertical portions and joining said vertical portions in a substantially straight line which approaches the upper edge of the vertical portions toward the outer ends thereof, and an upper portion consisting of slightly yielding slideways and transparent panels of celluloid provided with frames and movably arranged in said slideways in substantially the same plane as said vertical portions, said slideways made up of a single strip of sheet metal formed to provide spaced side portions and a portion which overlaps and is pressed against the side portions together with a channel for the reception of the stiffening rod, substantially as described.

7. The combination with a stationary part of an automobile, of a wind shield hingedly connected with said stationary part, said wind shield comprising an upright central strip, a lower sheet metal portion affixed to said strip and consisting of substantially plane vertical portions extending outwardly and rearwardly from said central strip and substantially plane portions extending forwardly and downwardly from the vertical portions and joining said vertical portions in a substantially straight line which approaches the upper edge of the vertical portions toward the outer end thereof, and an upper portion consisting of transparent panels arranged in slideways in substantially the same plane as said vertical portions, and means for adjusting said wind shield in tilted position, substantially as described.

In testimony whereof, we have signed our names to this specification in the presence of two subscribing witnesses at Los Angeles county of Los Angeles, State of California, this 13th day of June A. D. 1911.

EDWARD J. BESEMAN.
FREDERICK NICHOLS.

Witnesses:
ALEX. H. LIDDERS,
FRED A. MANSFIELD.